UNITED STATES PATENT OFFICE.

EDWARD LOEFLUND, OF STUTTGART, WÜRTEMBERG, GERMANY.

PROCESS OF PRESERVING MILK OR CREAM.

SPECIFICATION forming part of Letters Patent No. 301,733, dated July 8, 1884.

Application filed January 14, 1884. (No specimens.) Patented in Belgium December 22, 1883, No. 63,631; in France December 22, 1883, No. 159,344; in Germany December 22, 1883, and in Italy December 31, 1883, XXXII, 382.

*To all whom it may concern:*

Be it known that I, EDWARD LOEFLUND, of Stuttgart, Kingdom of Württemberg, German Empire, have invented certain new and useful Improvements in the Processes of Preserving Milk or Cream, of which the following is a specification.

This invention relates to proceedings for preserving milk or cream by the addition of unfermented concentrated extract of malted wheat, barley, or oats, or any combination thereof, as a food for infants and invalids.

The method of proceeding is as follows: One hundred liters of fresh cow's milk, with all the cream, or a proportionate quantity of cream alone, are warmed in an open pan heated by steam to a temperature of 90° centigrade. Then are added twenty kilograms of unfermented concentrated extract made from malted wheat, barley, or oats, or any combination thereof. The extract is then properly dissolved and mixed with the milk. When the fluid has become uniform and smooth, it is brought into a vacuum apparatus and condensed, at a temperature not exceeding 50° centigrade, to a mass of the consistency of soft butter, which is the case when its weight is reduced to forty kilograms. The product is finally filled in tins, which are hermetically closed by soldering.

In preparing the malt extract the principle is to be observed that all the starch of the malted cereals should be converted into dextrine and sugar by the action of the diastase; also, the natural acid of the malt solution is to be neutralized by the addition of a small quantity of carbonate of potassium or sodium.

What I claim as new, and desire to secure by Letters Patent, is—

The mode herein described of preparing milk or cream for preservation, said mode consisting in first heating the milk or cream nearly to the boiling-point, then adding an unfermented concentrated extract of malted cereals, the natural acid of which has previously been neutralized, then condensing the fluid in a vacuum apparatus to the consistence of soft butter, and finally hermetically sealing the product in suitable vessels, all substantially as set forth.

In testimony whereof I have signed my name to this specification in the presence of two subscribing witnesses.

EDWARD LOEFLUND.

Witnesses:
 CARL GUNNINGER,
 GUSTAV LOEFLUND.